United States Patent
Papadopoulos

(10) Patent No.: US 9,242,162 B2
(45) Date of Patent: *Jan. 26, 2016

(54) ROLLER TRAINER ASSEMBLY WITH LINEAR BEARINGS

(76) Inventor: Larry Papadopoulos, North Plains, OR (US)

(*) Notice: Subject to any disclaimer, the term of this patent is extended or adjusted under 35 U.S.C. 154(b) by 400 days.

This patent is subject to a terminal disclaimer.

(21) Appl. No.: 13/108,921

(22) Filed: May 16, 2011

(65) Prior Publication Data

US 2011/0218080 A1 Sep. 8, 2011

Related U.S. Application Data

(63) Continuation-in-part of application No. 12/456,728, filed on Jun. 22, 2009, now Pat. No. 7,942,790, which is a continuation of application No. 11/520,288, filed on Sep. 13, 2006, now Pat. No. 7,604,575.

(60) Provisional application No. 60/716,852, filed on Sep. 14, 2005.

(51) Int. Cl.
A63B 69/16 (2006.01)

(52) U.S. Cl.
CPC .................................. A63B 69/16 (2013.01)

(58) Field of Classification Search
CPC .... A63B 22/08; A63B 23/0476; A63B 69/16; A63B 2069/161; A63B 2069/164; A63B 2069/166; A63B 2069/167; A63B 23/16
USPC ........................... 482/57–65, 907, 51; 434/61
See application file for complete search history.

(56) References Cited

U.S. PATENT DOCUMENTS

| 581,835 | A | * | 5/1897 | Sturgis | 482/61 |
| 2,498,047 | A | * | 2/1950 | Myers | 601/93 |
| 4,135,535 | A | * | 1/1979 | Thomas | 135/67 |
| 4,802,666 | A | * | 2/1989 | Rodriqguez | 482/61 |
| 4,932,651 | A | * | 6/1990 | Defaux | 482/61 |
| 5,662,559 | A | * | 9/1997 | Vasquez | 482/61 |
| 6,857,992 | B1 | * | 2/2005 | Kolda et al. | 482/61 |
| 2006/0217237 | A1 | * | 9/2006 | Rhodes et al. | 482/61 |

FOREIGN PATENT DOCUMENTS

WO WO 9423807 A1 * 10/1994

OTHER PUBLICATIONS www.lm76.co/a_series_linear_ball_bearing.htm Dec. 24, 2007.*

* cited by examiner

Primary Examiner — Loan H Thanh
Assistant Examiner — Nyca T Nguyen
(74) Attorney, Agent, or Firm — Timothy E. Siegel Patent Law, PLLC; Timothy E. Siegel

(57) ABSTRACT

A bicycle roller assembly, comprising a frame having a length and including two parallel rods running in the lengthwise dimension of said frame and having a front roller and a pair of rear rollers mounted between said parallel rods. In addition, a base assembly including a set of feet is adapted to rest on a surface. Finally, a support assembly is supported by said base assembly, and includes a set of linear bearings, into which said parallel rods are mounted, so as to permit movement in said lengthwise dimension.

3 Claims, 5 Drawing Sheets

FIG. 3A

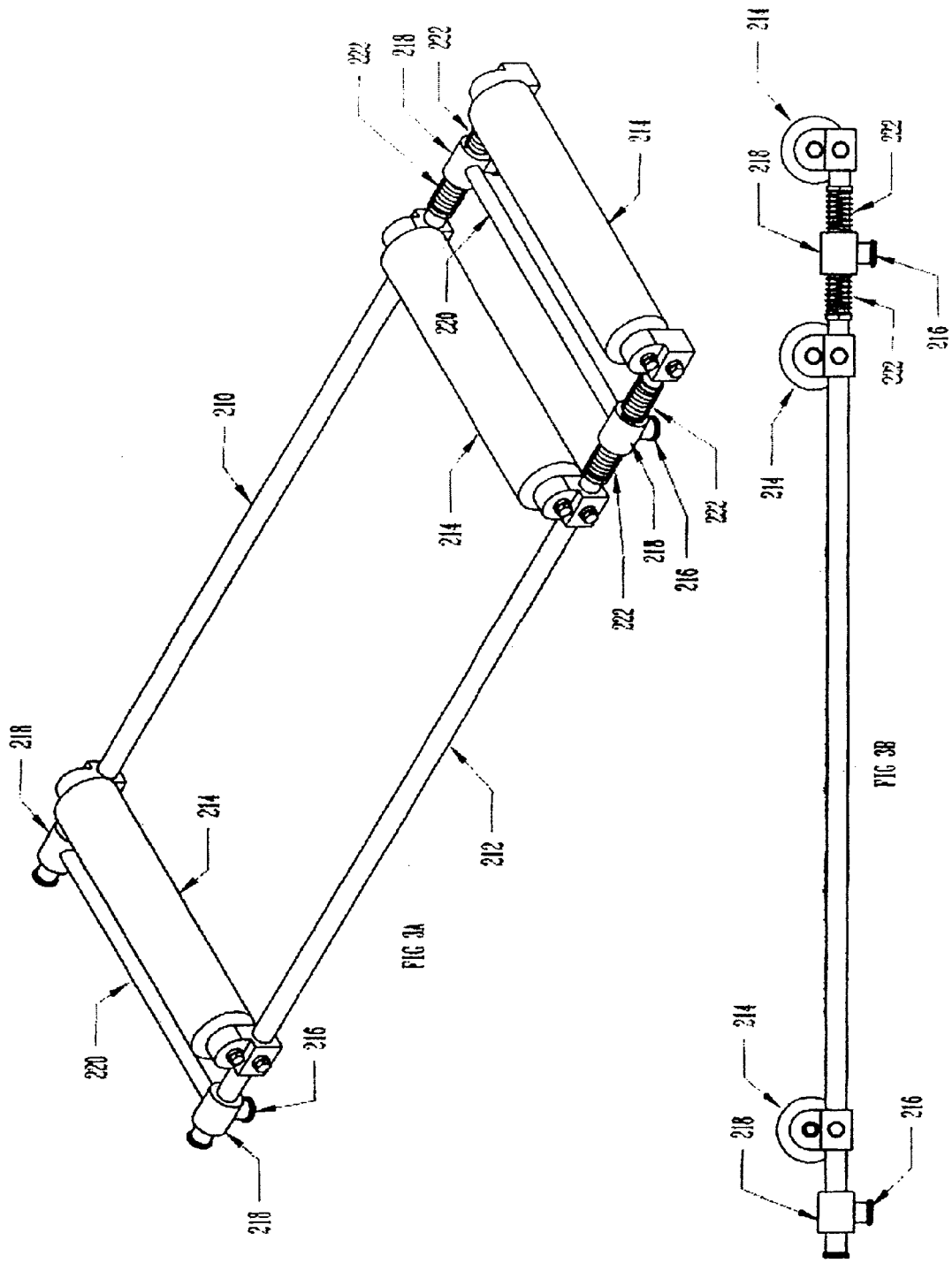

ROLLER TRAINER ASSEMBLY WITH LINEAR BEARINGS

RELATED APPLICATIONS

This application is a continuation-in-part of application Ser. No. 12/456,728 filed Jun. 22, 2009, now U.S. Pat. No. 7,942,790 which was a continuation of patent application Ser. No. 11/520,288 filed Sep. 13, 2006, now U.S. Pat. No. 7,604,575 which claimed priority from provisional application Ser. No. 60/716,852 filed Sep. 14, 2005.

BACKGROUND

A bicycle training device known as "bicycle rollers" has been available for over one hundred years. This device consists of three rollers supported by a frame. In use, the rear wheel of a bicycle is brought to rest on two, relatively closely spaced (by about 20 cm) bracketing rollers and the front wheel is balanced on top of the third roller. This device permits a user to balance and steer the bicycle (within a range) and to pedal at any speed desired. Unfortunately, users are constrained as to how aggressively they can exercise since rapid changes in pedaling speed and rider position can easily cause the rear wheel to pop out of its bracketing rollers. Additionally, a bicycle which is rigidly constrained acts to discourage the rider's natural movement and is somewhat uncomfortable to ride. It is a principle object of this invention to provide an additional degree of motion to more closely duplicate the natural feel of outdoor cycling.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect the present invention is a bicycle roller assembly, comprising a frame having a length and including two parallel rods running in the lengthwise dimension of said frame and having a front roller and a pair of rear rollers mounted between said parallel rods. In addition, a base assembly including a set of feet is adapted to rest on a surface. Finally, a support assembly is supported by said base assembly, and includes a set of linear bearings, into which said parallel rods are mounted, so as to permit movement in said lengthwise dimension.

In a second separate aspect the present is a bicycle roller assembly, comprising, a frame; a front roller mounted in said frame; and a pair of rear rollers mounted in said frame. a bicycle, having a front wheel and a rear wheel, is mounted on said rollers by having said front wheel balanced on said front roller and said rear wheel supported by said pair of rear rollers. Finally, a forward-movement stopping bumper/roller is mounted on said frame and is positioned so that it acts to constrain said bicycle when it moves forward from its intended position on said assembly.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 3A is a perspective view of an additional alternative preferred embodiment of a bicycle training device.

FIG. 3B is a side view of the bicycle training device of FIG. 3A.

DETAILED DESCRIPTION OF THE PREFERRED EMBODIMENTS

Figure 1:
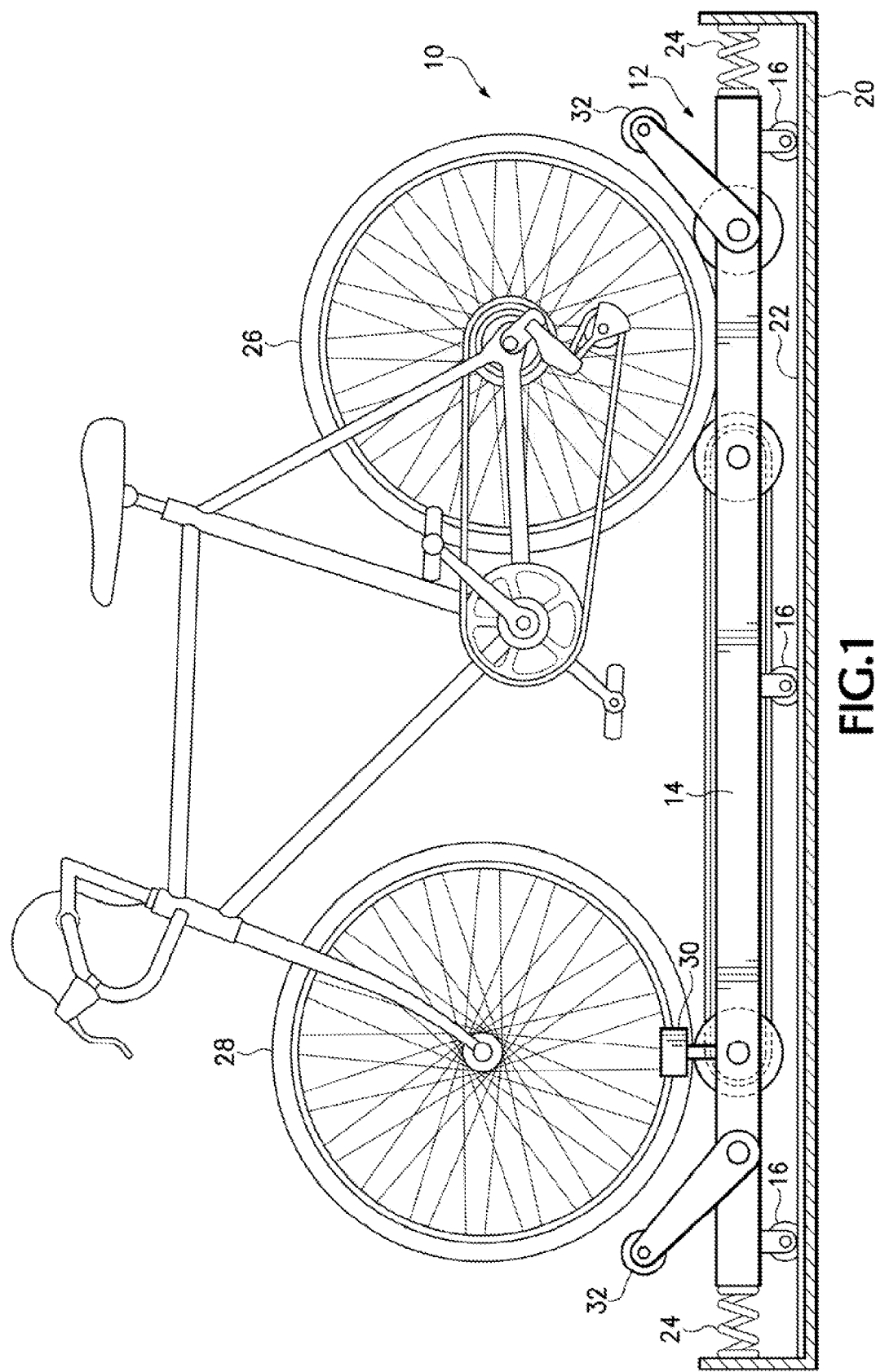
FIG. 1 is a side view of a bicycle training assembly according to a preferred alternative embodiment of the present invention.
Figure 1A:
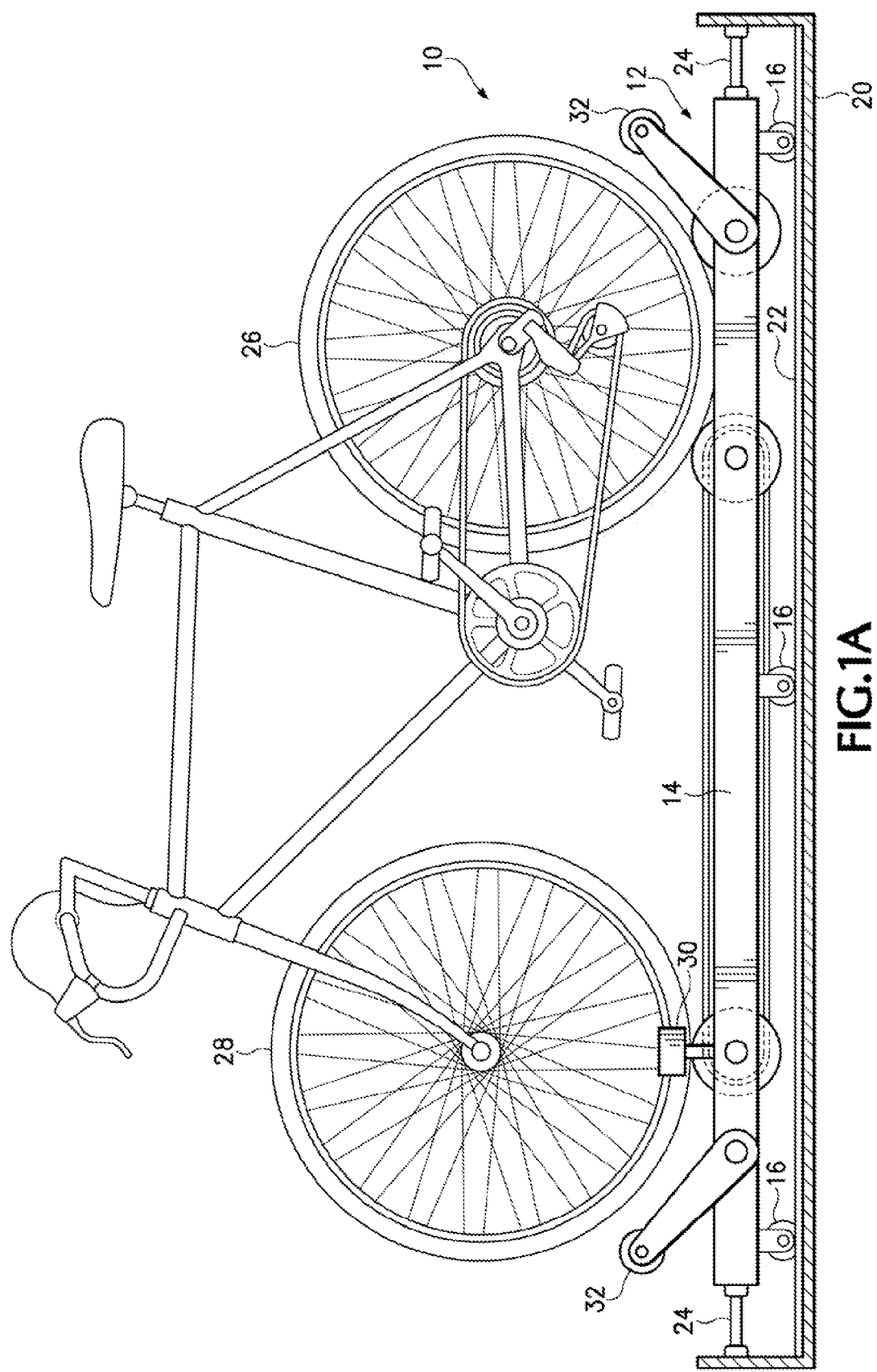
FIG. 1A is a side view of the bicycle training assembly of FIG. 1, but with bungees serving as the springs.

Referring to FIG. 1, a training assembly 10, includes a set of bicycle rollers 12 having a rollers frame 14, which is supported by wheels 16. In turn rollers 12 are constrained by an assembly frame 20, which also provides a pair of tracks 22 (only one shown) for wheels 16, thereby permitting relative motion between the rollers 12 and the assembly frame 20. Additionally, a light spring device 24 acts to gently return the rollers (and bicycle rider) to the center of the stroke whenever the rider's actions generate a plus or minus motion, thereby permitting equal amounts of forward and rearward motion from a central point. Preferably, a vibration damping spring, such as an elastomeric linear element (bungee) is used for spring 24 (as shown in FIG. 1A).

In an alternative preferred embodiment a stationary exercise bicycle is mounted so that fore and aft movement relative to a supporting surface is permitted during use. In the context of this application the term "bicycle-utilizing bicycle trainer" is any device into which an actual bicycle is placed, prior to use. This includes both bicycle rollers and plain or basic trainers, but not exercise bicycles.

Providing a frame 20 into which the bicycle training device, such as bicycle rollers 12 is set, provides a smooth, hard surface for wheels 16 to rotate and permits the tethering of a spring that gently moves rollers 12 back to the center of frame 20 when the bicycle rider's motion has pulled rollers 12 for or aft. In an alternative preferred embodiment, however, frame 20 is not present and bicycle rollers 12, equipped with wheels 16, is set onto a hard smooth surface, such as a concrete or cement surface. If wheels 16 are made of polymeric material, rollers 12 can even be set onto a wooden floor without damaging the floor. In addition, wheels 16 may be adapted for their intended use. For example, pneumatic tires can be used for use of rollers 12 on an asphalt surface. Although in this embodiment springs are not present to return rollers 12 to their starting position, in practice there is not a great deal of movement and a paved area that is only slightly larger than rollers 12 can accommodate a bicycle rider training on the wheeled rollers 12.

The front wheel 28 of the bicycle mounted on rollers 12 is prevented from slipping off rollers 12 by a pair of horizontally mounted rollers 30. Because they are rotatable, rollers 30 constrain front wheel 28 without stopping its rotation, which could cause an accident, potentially injuring the bicycle rider.

Likewise for and aft rotatable roller/bumpers 32 prevent further movement when front and rear bicycle wheels 28 and 26 move fore or aft from the intended position on rollers 12. Roller/bumpers 32 act to gently return wheels 28 and 26 to their intended position. Skilled persons will readily recognize, from a view of FIGS. 1 and 1A, that when a bicycle is mounted on rollers so that the rear wheel 26 is centered midway between rear rollers, that neither the front or rear bicycle wheel 28 and 26, touch a roller/bumper 32.

In alternative preferred embodiments, wheels 16 are replaced by some other relative motion permitting assembly adapted to permit for and aft motion between the rider and the surface upon which assembly 10 or other similar assembly is resting. These preferred embodiments include the case in which frame 20 is not provided and wheels 16 rest on some available surface such as a floor or a patio. In this embodiment wheels 16 may be enlarged and/or fitted with pneumatic tires. Other embodiments include cases in which the relative motion permitting assembly includes a frame, such as frame 20, but where wheels 16 are mounted upwardly on frame 20 rather than downwardly on trainer device 12. Alternatively, sliding surfaces on 20 and 12 could provide relative motion, or ball bearings, possibly in races, could provide the relative motion between a frame, such as frame 20 and a trainer device, such as trainer device 12.

Figure 2:
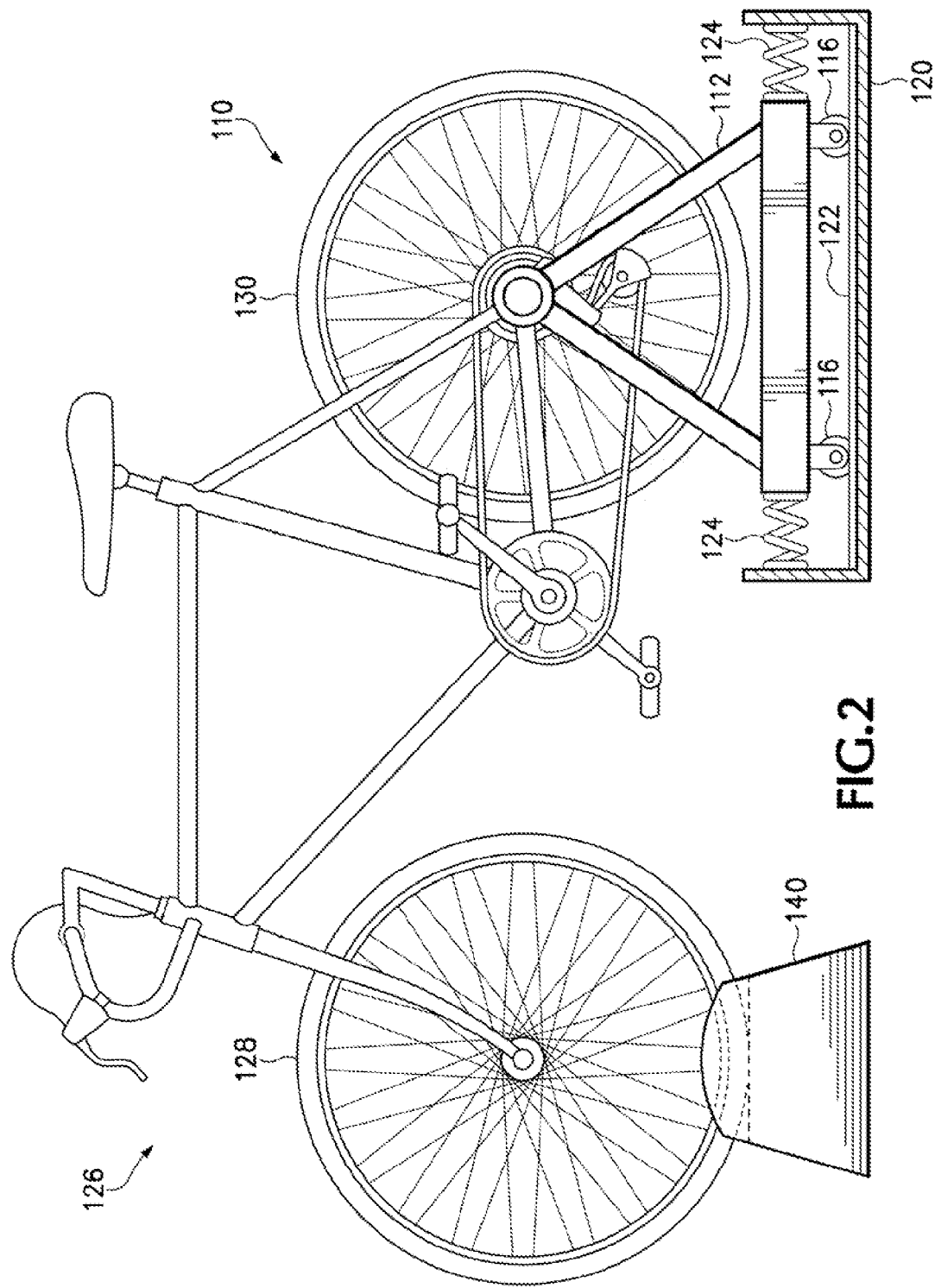
FIG. 2 is side view of a bicycle training assembly according to an alternative preferred embodiment of the present invention.

Referring to FIG. 2, in an alternative preferred embodiment of a training assembly 110, a basic trainer 112 is placed on wheels 116 and set into a frame 120 to travel on tracks 122 and is returned to center by springs 124. Trainer 112 keeps bicycle 126 laterally upright and provides resistance to rear wheel 130. A stool 140 is provided for front wheel 128, which does not rotate and will translate in the same constrained manner as rear wheel 130.

Figure 3C:
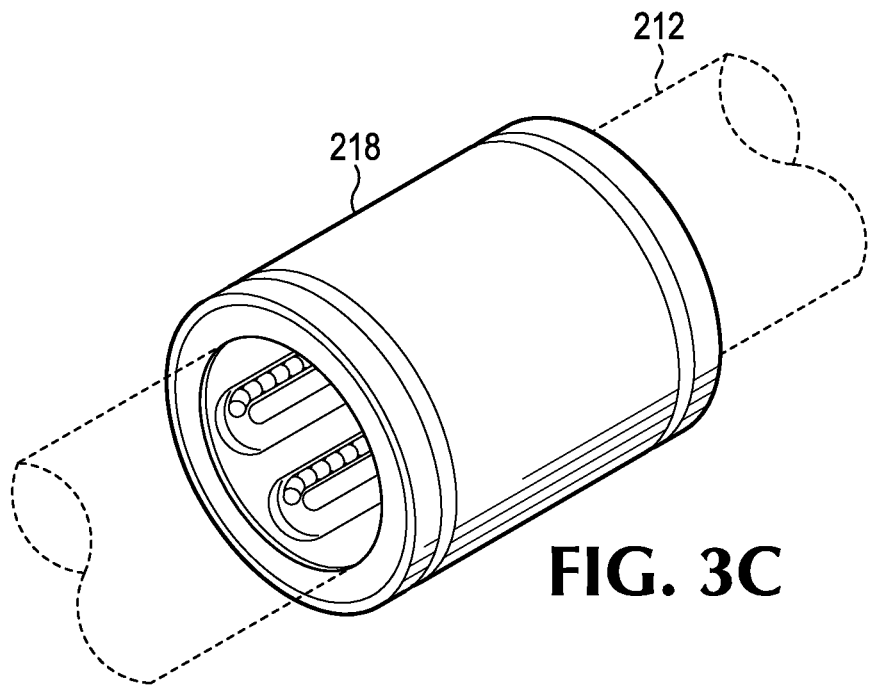
FIG. 3C is a detail view of a portion of FIG. 3A, showing a linear bearing and a portion of the shaft that passes through that linear bearing.

Referring to FIGS. 3A and 3B, in an additional alternative preferred embodiment of a bicycle rollers assembly 210, longitudinal elements 212 that are round in cross-section support the set of rollers 214 upon which a bicycle rests, while in use. A set of feet 216 support a set of linear bearings 218, into which are mounted longitudinal elements 212. To complete a frame structure, the transversely separated linear bearings 218 are joined by cross-members 220. There are many different types of linear bearings available that could be used as bearings 218. In a preferred embodiment, linear bearings 218 incorporate ball bearings to support the longitudinal elements 212, as shown in FIG. 3C. Finally, a motion resisting assembly, in this embodiment comprising springs 222, provides gentle resistance to the linear motion of elements 212 within bearings 218. Skilled persons will recognize that the term "springs" is not limited to coil springs but can apply to any element that progressively resists motion.

In a preferred embodiment, linear bearings 218 are more specifically, 1" linear bearings having part number A162536DD, from LM-Tarbell of 140 Industrial Drive, East Longmeadow, Mass. 01028, which has a website address of www.lm76.com. In this embodiment, linear bearings 218 may be supported by an SPB16B mounting block, and longitudinal elements 212 are LMRC-16-xx 1" linear shafting, both also available from LM-Tarbell.

In an alternative preferred embodiment longitudinal elements 212 and linear bearings 218 are square in cross-section. Suitable elements for this design are available from LM-Tarbell and are shown online at www.lm76.com/profile_rail_guides.htm.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A bicycle roller assembly, comprising:
 (a) a frame having a length and including two parallel rods running in a lengthwise dimension of said frame;
 (b) a front roller mounted between said parallel rods;
 (c) a pair of rear rollers mounted between said parallel rods; and
 (d) a base assembly including a set of feet adapted to rest on a surface; and
 (e) a support assembly, supported by said base assembly, and including a set of low-friction linear bearings, which each incorporate ball bearings, into which said parallel rods are mounted and are supported by said ball bearings, so as to permit movement of said parallel rods in said lengthwise dimension.

2. The bicycle roller assembly of claim 1, further including motion resistance springs positioned and configured to provide gentle resistance to said movement in said lengthwise dimension.

3. The bicycle roller assembly of claim 1, wherein said low-friction linear bearings permit fore and aft movement caused by the force applied by a rider of a bicycle placed on said roller assembly.

* * * * *